United States Patent
Wesenberg et al.

(10) Patent No.: US 11,273,863 B2
(45) Date of Patent: Mar. 15, 2022

(54) METHOD FOR OPERATING A MOTOR VEHICLE AND CORRESPONDING MOTOR VEHICLE

(71) Applicant: AUDI AG, Ingolstadt (DE)

(72) Inventors: André Wesenberg, Pfaffenhofen (DE); Michael Redeker, Reichertshofen (DE); Michael Käßmeyer, Rain am Lech (DE)

(73) Assignee: AUDI AG, Ingolstadt (DE)

( * ) Notice: Subject to any disclaimer, the term of this patent is extended or adjusted under 35 U.S.C. 154(b) by 177 days.

(21) Appl. No.: 16/668,512

(22) Filed: Oct. 30, 2019

(65) Prior Publication Data

US 2020/0130734 A1     Apr. 30, 2020

(30) Foreign Application Priority Data

Oct. 30, 2018   (DE) .......................... 102018218588.3

(51) Int. Cl.
*B62D 5/04*       (2006.01)
*B62D 6/00*       (2006.01)
(Continued)

(52) U.S. Cl.
CPC ......... *B62D 5/0484* (2013.01); *B62D 5/0496* (2013.01); *B62D 6/00* (2013.01);
(Continued)

(58) Field of Classification Search
CPC .. B62D 5/0481; B62D 5/0484; B62D 5/0487; B62D 5/049; B62D 5/0493; B62D 5/0496; B62D 5/30; B62D 6/00; B60W 20/50

See application file for complete search history.

(56) References Cited

U.S. PATENT DOCUMENTS

2007/0215405 A1*  9/2007  Tsutsumi ............. B62D 5/0478
                                                          180/402
2018/0001926 A1*  1/2018  Swieter ................ B62D 6/003
(Continued)

FOREIGN PATENT DOCUMENTS

DE         10052343 A1    7/2002
DE      102004030685 A1    2/2005
(Continued)

OTHER PUBLICATIONS

German Search Report dated Jul. 2, 2019 in corresponding German Application No. 102018218588.3; 21 pages; Machine-generated translation attached.

*Primary Examiner* — Thomas G Black
*Assistant Examiner* — Sara J Lewandroski
(74) *Attorney, Agent, or Firm* — Maier & Maier, PLLC

(57) ABSTRACT

A method for operating a motor vehicle, wherein the motor vehicle has a steering system for steering at least one wheel of the motor vehicle by means of a drive. In doing so, it is provided that a time span is determined for at least one countermeasure limiting a hazard to a vehicle occupant upon an at least partial failure of the steering system, within which time span the countermeasure deploys an effect, and that a state variable (T) influencing the operating capacity of the steering system is determined and extrapolated over time and a point in time ($t_1$) is calculated in which the state variable (T) exceeds a limit value ($T_1$), wherein the countermeasure is introduced when the point in time ($t_1$) is less than the time span in the future.

17 Claims, 1 Drawing Sheet

(51) Int. Cl.
*B60W 20/50* (2016.01)
*B62D 5/30* (2006.01)

(52) U.S. Cl.
CPC ........... *B60W 20/50* (2013.01); *B62D 5/0481* (2013.01); *B62D 5/30* (2013.01)

(56) References Cited

U.S. PATENT DOCUMENTS

| | | | |
|---|---|---|---|
| 2019/0106115 A1* | 4/2019 | Huang | B60R 16/0232 |
| 2019/0108694 A1* | 4/2019 | Huang | G07C 5/0816 |
| 2019/0111969 A1* | 4/2019 | Pramod | B62D 5/006 |
| 2019/0152513 A1* | 5/2019 | Awan | B62D 5/0484 |

FOREIGN PATENT DOCUMENTS

| | | | |
|---|---|---|---|
| DE | 10297644 T5 | 10/2005 | |
| DE | 102010061298 B3 | 6/2012 | |
| DE | 102016208775 A1 | 11/2017 | |
| JP | 4062207 B2 | 3/2008 | |

\* cited by examiner

METHOD FOR OPERATING A MOTOR VEHICLE AND CORRESPONDING MOTOR VEHICLE

FIELD

The disclosure relates to a method for operating a motor vehicle, wherein the motor vehicle has a steering system for steering at least one wheel of the motor vehicle by means of a drive. The disclosure further relates to a motor vehicle.

BACKGROUND

For example, publication DE 10 2016 2008 775 A1 is known from the prior art. This document describes a steer-by-wire system for a motor vehicle, having at least two steerable wheels, which are independent of one another in normal operation of the steer-by-wire system, at least two steering actuators, which are each assigned to one of the steerable wheels and configured to adjust the steering angle of the respective steerable wheel, and at least one steering electronics element connected to the steering actuators using signal technology, said steering electronics element being configured to individually actuate the steering actuators based on steering commands. In order to increase the driving safety of a motor vehicle having such a steer-by-wire system, it is proposed that the steering electronics element is configured to determine whether one of the steering actuators has failed and, upon detection of a failure of a steering actuator characterizing emergency operation of the steer-by-wire system, to actuate the at least one further steering actuator with a steering ratio, the directness of which deviates from a directness of a steering ratio in normal operation.

SUMMARY

The object of the invention is to propose a method for operating a motor vehicle that has advantages as compared to known methods, particularly that enables a reliable and safe lateral control of the motor vehicle.

It is provided that a time span is determined for at least one countermeasure limiting a hazard to a vehicle occupant upon an at least partial failure of the steering system, within which time span the countermeasure deploys an effect, and that a state variable influencing the operating capacity of the steering system is determined and extrapolated over time and a point in time is calculated, in which the state variable exceeds a limit value, wherein the countermeasure is introduced when the point in time is less than the time span in the future.

The steering system is used to steer the motor vehicle, that is to steer the at least one wheel of the motor vehicle, preferably several wheels assigned to the same wheel axle of the motor vehicle. To the extent that solely one wheel is addressed within the scope of this description, the embodiments can always be transferred to the number of wheels and/or each of the several wheels. The steering of the wheel takes place, for example, via at least one steering lever. The steering lever preferably engages one wheel carrier, on which the wheel, in turn, is rotatably mounted. The steering lever may be formed from a steering arm or engage the wheel carrier separately from such a steering arm.

If there are severable steerable wheels, each of the wheels is rotatably mounted on its own wheel carrier. The wheel carriers are arranged apart from one another and rotatably mounted on a body of the motor vehicle, that is about axes of rotation arranged apart from one another. A steering lever engages each of the wheel carriers, preferably in the form of a steering arm. Preferably, the steering arms are connected to one another via a tie rod, wherein the tie rod may be designed as one piece or multiple pieces. The drive of the steering system engages the steering lever, for example directly or only indirectly, particularly via the tie rod. For example, the drive engages the tie rod directly and engages the steering lever and/or the steering arm by means of said tie rod. A steering movement of the wheel or the wheels can be effected with the assistance of the drive.

The steering system is preferably in the form of an electric steering system such that the drive has at least one electric motor. For example, the electric motor is an alternating current motor or a three-phase motor. Especially preferably, the electric motor is formed as a synchronous motor, particularly as a permanent-magnet synchronous motor. A design of the electric motor as a direct-current motor, however, may also be implemented. Basically, the actuator may be designed as desired. For example, it may be formed—generally stated—as an electric, hydraulic, pneumatic, electrohydraulic, or electropneumatic actuator. Due to corresponding actuation of the drive, a certain steering angle for the motor vehicle and/or for the at least one wheel is set with the assistance of the steering system.

Finally, when there is a steering input, the at least one wheel and/or the steering lever is shifted such that a steering movement is effected. The steering input, for example, is to be understood as the input of a steering angle, particularly of a modified steering angle, by a driver of the motor vehicle and/or a driver assistance apparatus of the motor vehicle. Thus, if the steering angle set within the scope of the steering input deviates from the current steering angle, the current steering angle is modified with the assistance of the drive due to the action of the steering movement in the direction of the defined steering angle, particularly is set thereto. To this end, the drive and/or the electric motor is effectively connected to the wheel and/or the steering lever such that a rotational movement of the electric motor is converted into a rotational movement of the wheel and/or of the steering lever.

In the event of an at least partial failure of the steering system, for example a failure of the drive, a reliable lateral control of the motor vehicle, particularly a partially or completely autonomous lateral control, is no longer reliably implementable. In order to limit a hazard to the vehicle occupant and/or the vehicle occupants in the event of such an at least partial failure of the steering system, at least one countermeasure is stored, which counteracts the hazard. Basically, any number of countermeasures may be stored. Within the scope of this description, only one countermeasure is addressed. However, the embodiments can always be transferred to a number of countermeasures and/or one of the several countermeasures. Within the scope of this description, countermeasure should be understood to mean one countermeasure or a number of countermeasures, in other words, at least one countermeasure.

The countermeasure may be essentially of any nature. For example, it comprises a reduction in the speed of the motor vehicle or the like. For the stored countermeasure and/or for each of the stored countermeasures, the time span in which the countermeasure deploys an effect is determined. In the event of reduction of the speed of the motor vehicle, the time span corresponds to the particular time span, for example, within which the speed can be reduced down to a certain speed or the motor vehicle can be decelerated until the point of stoppage. This time span typically depends on the current speed of the motor vehicle. The time span can be permanently stored together with the countermeasure. It may also be provided that it is determined as needed or periodically.

In addition, it is provided to determine the state variable influencing the operating capacity of the steering system. The state variable describes, for example, an operating state, an efficacy, and/or an efficiency of the steering system. For example, a temperature that has influence on the drive of the steering system may be applied as the state variable. Thus, the maximum steering torque achievable by means of the drive typically decreases as the temperature increases.

The state variable is extrapolated over time in order to calculate the particular point in time in which the state variable exceeds or will exceed the limit value. The limit value is preferably selected such that a reliable, proper operation of the steering system can be implemented as long as the state variable is less than the limit value. The point in time thus describes that particular point in time starting at which the operating capacity of the steering system is negatively impacted and thus there is at least partial failure of the steering system.

Subsequently, there is a check to determine how far the point of time is in the future; in other words, the time difference between the calculated point in time and the current point in time is determined. If it is determined that the point in time is not as far in the future as is needed for implementing the countermeasure, the countermeasure is introduced immediately. In other words, the countermeasure is introduced when the point in time is less than the time span in the future.

Preferably, the determination of the state variable, the extrapolation over time thereof, as well as the calculation of the point in time are implemented such that the countermeasure can then be introduced when the point in time is precisely at the time span in the future, i.e. at the earliest possible point in time. In this case, the countermeasure can predictably be completely implemented by the time the calculated point in time is reached.

The described procedure for operating the motor vehicle enables early detection of a potential failure of the steering system and a corresponding introduction of the countermeasure. Thus, a very high degree of safety of the motor vehicle is achieved and the hazard to the vehicle occupant is reliably prevented.

A refinement of the invention provides that a temperature, an electric voltage, an electrical resistance, a road slope, or a wind speed is used as the state variable. For example, an ambient temperature, a temperature of the drive and/or of the electric motor of the drive, a coolant temperature, or the like is used as the temperature. The electric voltage is present, for example, in an electrical system of the motor vehicle or in a current circuit of the steering system. In particular, the voltage is the particular voltage that is available for operating the drive. The electrical resistance describes, for example, the resistance of the drive and/or its electric motor.

The road slope preferably describes a slope of the ground underneath the motor vehicle. As an alternative to the road slope, a motor vehicle slope may also be applied, which describes which slope the motor vehicle has with respect to a gravitational force vector and/or a plane perpendicular to the gravitational force vector. The wind speed is the speed of the wind in the environment of the motor vehicle, particularly of the true wind.

Additionally or alternatively, an aging variable describing an age of the steering system, a friction variable describing a friction within the steering system, and/or a wear variable describing mechanical wear of the steering system may be the state variable. The older the steering system, the greater the aging variable. For example, the aging variable depends directly or indirectly on the operating period of steering system, on a number of steering maneuvers implemented by means of the steering system over its operating period, on a steering angle integrated over the operating period, or the like.

The friction variable describes, for example, the mechanical friction occurring within the steering system. The friction can be determined as a function of the operating period of the steering system and/or of the previously described temperature. Typically, the longer the operating period, the lower the friction; and/or the lower the temperature, the higher the friction. The friction can additionally be measured, for example, in that driving takes place against a defined steering resistance by means of the actuator.

The mechanical wear and/or the wear variable can be determined as a function of a force integral, which is determined, in turn, from the actuating force integrated over the operating period, said actuating force being effected by the actuator. Additionally or alternatively, it is determined how often at least one end stop of the steering system was approached by means of the actuator. The higher this number, the greater the wear variable selected. For example, the wear variable is incremented by a certain value per approach to the at least one end stop.

Of course, only one single state variable may be determined and extrapolated over time in order to calculate the point in time. Preferably however, this occurs for a number of state variables, for example several of the previously mentioned state variables. It may be provided to introduce the countermeasure only when the respective point in time of all state variables used is less than the time span in the future. Especially preferably, it is provided, however, to introduce the countermeasure when the point in time for only one of the state variables is less than the time span in the future. With such a procedure, the hazard to the vehicle occupant is prevented in an especially reliable way and manner.

A preferred embodiment of the invention provides that a reduction in the speed of the motor vehicle, particularly to the point of stoppage, a switchover to a further drive in order to steer the at least one wheel, or information about a vehicle occupant is used as the countermeasure. The reduction in speed has previously been addressed herein. In addition to the drive, the further drive is a component of the steering system and is likewise used to steer the at least one wheel. This means that the wheel is optionally steerable by means of the drive or of the further drive.

In normal operation, the at least one wheel is steered with the assistance of the drive. Within scope of the countermeasure, a switch is made, however, from the one drive to the further drive such that subsequently the further drive, but not the drive, is used for steering. This may be the case, for example, within the scope of emergency operation. However, the countermeasure may also comprise the information on the vehicle occupant. The information may be optic, acoustic, or haptic information. In any case, the information should occur such that the vehicle occupant is notified of the imminent at least partial failure of the steering system. The hazard to the vehicle occupant is effectively reduced in this way and manner.

It may be provided that a lateral control of the motor vehicle is carried out simultaneously and/or together with the reduction of the speed of the motor vehicle. This takes place, for example, such that the motor vehicle is steered to a safe parking place, particularly to a shoulder, a parking bay, a parking lot, or the like.

Within the scope of a further embodiment of the invention, it is provided that the information about the vehicle occupant occurs at a time before the point in time and upon or after the determination that the point in time is less than the time span in the future, and the reduction in speed of the motor vehicle or the switchover to the further drive is implemented at the point in time and/or upon the exceeding of the limit value by the state variable. Accordingly, thus a multistage method is implemented in which initially the warning to the vehicle occupant is carried out such that the vehicle occupant can counteract the at least partial failure of the steering system.

If the vehicle occupant is not successful such that the state variable continues to increase until it finally exceeds the limit value, the countermeasure is introduced, for example one of the previously mentioned countermeasures, upon the exceeding of the limit value. Thus, the driver is initially given the opportunity to stabilize the motor vehicle through a manual intervention and/or to prevent the failure of the steering system. The exceeding of the limit value by the state variable can hereby be avoided in most cases.

A further preferred embodiment of the invention provides that the information is a prompt to the vehicle occupant to take over a lateral control of the motor vehicle by means of a control element. The control element is provided and formed for the lateral control of the motor vehicle, that is for controlling the at least one wheel of the motor vehicle. For example, the control element is a steering wheel. The control element may be directly or only indirectly coupled with the wheel and/or the wheel carrier. The direct coupling is preferably a direct mechanical coupling, for example via a steering gearbox. The indirect coupling may be, for example, an electromechanical coupling, for example within the scope of a drive-by-wire system. Such a procedure has the advantage that the vehicle occupant can have direct influence on the lateral control and thus can effectively stabilize the motor vehicle.

Finally, within the scope of a further embodiment of the invention, a provision may be that a control element mechanically coupled to the wheel is used as the control element. Reference has previously been made thereto. Preferably, the control element is in the form of a steering wheel, which is mechanically directly coupled to the wheel and/or the wheel carrier. The mechanical coupling has the advantage that, in any case, even upon failure of electronic components of the motor vehicle, the lateral control of the motor vehicle can be undertaken by the vehicle occupant.

The invention further relates to a motor vehicle, particularly for implementing the method according to one or more of the preceding claims, wherein the motor vehicle has a steering system for steering at least one wheel of the motor vehicle by means of a drive. In doing so, it is provided that the motor vehicle is designed to determine a time span for at least one countermeasure limiting a hazard to a vehicle occupant upon an at least partial failure of the steering system, within which time span the countermeasure deploys an effect, and that a state variable influencing the operating capacity of the steering system is determined and extrapolated over time, and a point in time is calculated in which the state variable exceeds a limit value, wherein the countermeasure is introduced when the point in time is less than the time span in the future.

Reference has already been made to the advantages of such an embodiment of the motor vehicle and/or such procedure. Both the motor vehicle as well as the method for the operation thereof may be further refined according to the statements within the scope of this description, to the extent that reference is made to them. It is obvious that the countermeasure is preferably only introduced once the aforementioned condition is fulfilled, that is the point in time is less than the time span in the future.

BRIEF DESCRIPTION OF THE DRAWINGS

The disclosure is explained in more detail in the following by means of exemplary embodiments, without limiting the invention. The following is shown.

DETAILED DESCRIPTION

Figure 1:
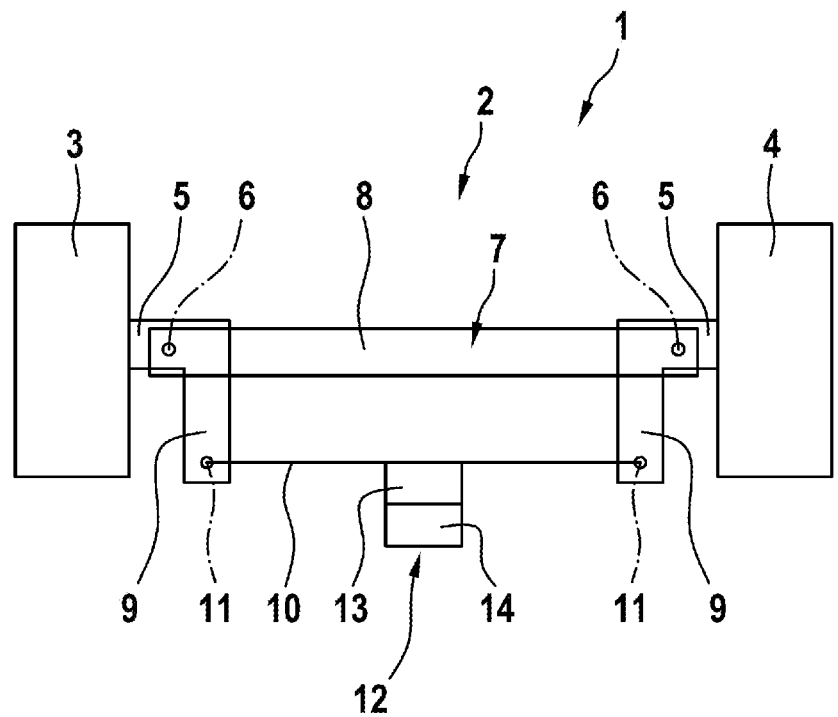
FIG. 1 a schematic representation of a region of a motor vehicle.

FIG. 1 shows a schematic representation of a region of a motor vehicle 1, namely a front axle 2 of the motor vehicle 1. Two wheels, 3 and 4, with different driving lanes are arranged on the front axle 2. Each of the wheels, 3 and 4, is rotatably mounted on a wheel carrier 5. The wheel carriers 5 are each rotatably mounted about an axis of rotation 6 on a part of a body 7 of the motor vehicle 1, for example on a cross-member 8. A steering lever 9 is effectively connected, particularly rigidly connected, to each of the wheel carriers 5.

In the exemplary embodiment shown here, the steering levers 9 are in the form of steering arms, which are connected to one another via a tie rod 10. The tie rod 10 is rotatably mounted about an axis of rotation 11 on each of the steering levers 9. The axes of rotation 11 are each arranged some distance from respective axis of rotation 6 such that a displacement of the tie rod 10, particularly a linear displacement of the tie rod 10, effects a rotational movement of the wheel carriers 5 about respective axis of rotation 6.

The steering levers 9 and the tie rod 10 are components of a steering system 12 for steering the motor vehicle 1 and/or the wheels, 3 and 4. The steering system 12 has a drive 13, which has at least one electric motor. The drive 13 and/or the electric motor is coupled to the tie rod 10. The drive 13 engages the tie rod 10 directly in this respect. In addition to drive 13, the steering system 12 has a further drive 14, which is designed similarly to drive 13. Upon a first adjustment of the steering system 12, drive 13 is coupled to the tie rod 10, but drive 14 is decoupled from the tie rod 10. Upon a second adjustment on the other hand, drive 13 is decoupled from the tie rod 10 and drive 14 is coupled to the tie rod. Thus, wheels 3 and 4 are optionally steered with the assistance of drive 13 or drive 14. A switchover between the first adjustment and the second adjustment requires a certain time span.

Figure 2:
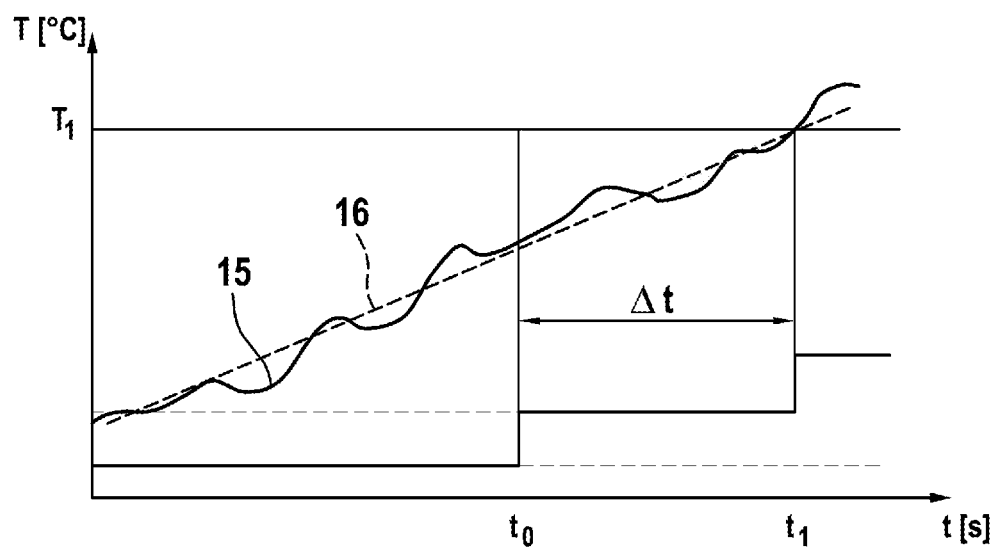
FIG. 2 a diagram in which a state variable of a steering system of the motor vehicle is applied over time.

FIG. 2 shows a diagram in which a state variable of the steering system 12, namely a temperature T, is applied over time t. The state variable is reflected by the curve 15. The state variable is extrapolated over time, namely over the current point in time $t_0$. To this end, the regression line 16 is derived from the curve 15 of the state variable. A point in time $t_1$ is calculated from the extrapolation over time, that is, for example, by means of the regression line 16, in said point in time the state variable predictably reaches or exceeds a limit value $T_1$. Subsequently, the time difference $\Delta t$ this point in time has in the future is calculated. Thus, difference $\Delta t$ corresponds to the difference between point in time $t_1$ and point in time $t_0$.

At least one countermeasure, which reduces and/or limits a hazard to a vehicle occupant of the motor vehicle 1 upon an at least partial failure of the steering system 12, is stored in the motor vehicle 1 and/or the steering system 12. This countermeasure may be, for example, the previously mentioned switchover between drive 13 and further drive 14. Alternatively, the countermeasure may be the reduction in speed of the motor vehicle 1. The particular time span in which the effect is deployed is determined for the countermeasure. In the case of switchover between drives 13 and 14, the time span describes the time that is necessary for switchover between the drives. If the countermeasure is the reduction in speed, the time span thus describes the time that is necessary to reduce the speed to a particular speed or until stoppage of the motor vehicle.

If it is then determined that the point of time $t_1$ in which the state variable T exceeds the limit value $T_1$ is less than the time span in the future, the countermeasure or one of the countermeasures is thus introduced immediately. It may be provided that information on the vehicle occupant is in the introduced countermeasure. In this case, the time span is, for example, the time period minimum that is required by the vehicle occupant or a driver of the motor vehicle in order to take over the lateral control completely. For example, the time span is at least 1 second, at least 5 seconds, or at least 10 seconds. After the information, another one of the countermeasures, that is a countermeasure different from the information, is undertaken preferably only upon the reaching of point in time $t_1$.

A reliable and safe lateral control of the motor vehicle 1 can be achieved with the described procedure and the described design of the motor vehicle 1. To this end, countermeasures are introduced particularly well before an at least partial failure of the steering system 12.

The invention claimed is:

1. A method for operating a motor vehicle, the motor vehicle comprising a steering system for steering at least one wheel of the motor vehicle by a drive, wherein the method comprises:
   determining a time span for at least one countermeasure limiting a hazard to a vehicle occupant upon an at least partial failure of the steering system, and
   triggering, within the time span, the countermeasure by deploying an effect,
   wherein determining a trigger timing of the countermeasure comprises determining a state variable (T) influencing the operating capacity of the steering system and extrapolating the state variable (T) over time, and calculating a point in time (t1) in which the state variable (T) exceeds a limit value (T1), wherein the countermeasure is introduced at a timing preceding the point in time (t1) by less than the time span.

2. The method according to claim 1, wherein a temperature, an electric voltage, an electrical resistance, a road slope, or a wind speed is used as the state variable (T).

3. The method according to claim 2, wherein a reduction in the speed of the motor vehicle, particularly to the point of stoppage, a switchover to a further drive in order to steer the at least one wheel, or information about a vehicle occupant is used as the countermeasure.

4. The method according to claim 2, wherein the countermeasure comprises at least one of information about a vehicle occupant, a reduction in speed, or a switchover to a further drive, wherein the information about the vehicle occupant occurs at a time before the point in time (t1) and upon or after the determination that a present point in time is less than the time span away from the point in time (t1), and the reduction in speed of the motor vehicle or the switchover to the further drive is implemented at at least one of the point in time and upon the exceeding of the limit value (T1) by the state variable (T).

5. The method according to claim 2, wherein the countermeasure comprises information provided to the vehicle occupant as a prompt to the vehicle occupant to take over a lateral control of the motor vehicle by means of a control element.

6. The method according to claim 2, wherein the control element is coupled mechanically to the wheel.

7. The method according to claim 1, wherein the control element is coupled mechanically to the wheel.

8. The method according to claim 1, wherein a reduction in the speed of the motor vehicle, particularly to the point of stoppage, a switchover to a further drive in order to steer the at least one wheel, or information about a vehicle occupant is used as the countermeasure.

9. The method according to claim 8, wherein the information is a prompt to the vehicle occupant to take over a lateral control of the motor vehicle by means of a control element.

10. The method according to claim 8, wherein the information about the vehicle occupant occurs at a time before the point in time (t1) and upon or after the determination that the point in time (t1) is less than the time span in the future, and the reduction in speed of the motor vehicle or the switchover to the further drive is implemented at at least one of the point in time and upon the exceeding of the limit value (T1) by the state variable (T).

11. The method according to claim 8, wherein the control element is coupled mechanically to the wheel.

12. The method according to claim 1, wherein the countermeasure comprises at least one of information about a vehicle occupant, a reduction in speed, or a switchover to a further drive, wherein the information about the vehicle occupant occurs at a time before the point in time (t1) and upon or after the determination that a present point in time is less than the time span away from the point in time (t1), and the reduction in speed of the motor vehicle or the switchover to the further drive is implemented at at least one of the point in time and upon the exceeding of the limit value (T1) by the state variable (T).

13. The method according to claim 12, wherein the information is a prompt to the vehicle occupant to take over a lateral control of the motor vehicle by means of a control element.

14. The method according to claim 12, wherein the control element is coupled mechanically to the wheel.

15. The method according to claim 1, wherein the countermeasure comprises information provided to the vehicle occupant as a prompt to the vehicle occupant to take over a lateral control of the motor vehicle by means of a control element.

16. The method according to claim 15, wherein the control element is coupled mechanically to the wheel.

17. A motor vehicle, wherein the motor vehicle has a steering system for steering at least one wheel of the motor vehicle by means of a drive, wherein the motor vehicle is configured to determine a time span for at least one countermeasure limiting a hazard to a vehicle occupant upon an at least partial failure of the steering system, within which time span the countermeasure deploys an effect, and
   wherein the motor vehicle is configured to determine and extrapolate a state variable (T) influencing the operating capacity of the steering system and calculate a point in time (t1) in which the state variable (T) exceeds a limit value (T1), wherein the countermeasure is introduced when the point in time (t1) is separated from a current point in time by less than the time span.

* * * * *